United States Patent
Park (10) Patent No.: US 9,954,988 B2
(45) Date of Patent: Apr. 24, 2018

(54) PHONE BOOK SYNCHRONIZATION CONTROL METHOD AND APPARATUS

(71) Applicant: Hyundai Motor Company, Seoul (KR)

(72) Inventor: Jeong Suck Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/214,725

(22) Filed: Jul. 20, 2016

(65) Prior Publication Data

US 2017/0310803 A1 Oct. 26, 2017

(30) Foreign Application Priority Data

Apr. 26, 2016 (KR) .......................... 10-2016-0050705

(51) Int. Cl.
| | |
|---|---|
| *H04B 7/00* | (2006.01) |
| *H04M 1/2745* | (2006.01) |
| *H04M 1/725* | (2006.01) |
| *B60R 16/023* | (2006.01) |

(52) U.S. Cl.
CPC ..... *H04M 1/274516* (2013.01); *B60R 16/023* (2013.01); *H04M 1/7253* (2013.01)

(58) Field of Classification Search
CPC . H04M 1/6066; H04M 2250/02; B60R 11/02; B60R 11/0241; B60R 1/04; G01C 21/00
USPC .................................. 455/569.1, 569.2, 41.2
See application file for complete search history.

(56) References Cited

U.S. PATENT DOCUMENTS

| | | | |
|---|---|---|---|
| 9,108,579 B2 | 8/2015 | Camacho et al. | |
| 2002/0049071 A1* | 4/2002 | Bjorn ............... | H04M 1/274583 455/556.1 |
| 2006/0229105 A1* | 10/2006 | Kim .................... | H04M 1/2745 455/564 |
| 2008/0096590 A1* | 4/2008 | Celik .................... | H04M 3/493 455/466 |
| 2010/0079194 A1* | 4/2010 | Zheng ................... | H02M 7/538 327/427 |
| 2011/0244838 A1* | 10/2011 | Chang ............. | H04M 1/274516 455/414.1 |

(Continued)

FOREIGN PATENT DOCUMENTS

| | | |
|---|---|---|
| JP | 2003-032361 A | 1/2003 |
| JP | 2007-158760 A | 6/2007 |

(Continued)

*Primary Examiner* — Edward Urban
*Assistant Examiner* — Max Mathew
(74) *Attorney, Agent, or Firm* — Mintz Levin Cohn Ferris Glovsky and Popeo, P.C.; Peter F. Corless (57) ABSTRACT

A method of controlling an audio-video-navigation (AVN) system includes: establishing a phone book access profile (PBAP) with a terminal using a communication unit of the AVN system; requesting, using the PBAP, that the terminal transmit a phone book size indicating an amount of phone book information included in a first partial list among a plurality of phone book lists stored in the terminal; selecting an action to perform based on the phone book size, the action selected from a group consisting of: requesting that the terminal transmit all of the plurality of phone book lists, displaying a previously stored phone book list, and deleting the previously stored phone book list; and performing the selected action.

18 Claims, 4 Drawing Sheets

(56) References Cited

U.S. PATENT DOCUMENTS

| | | | | |
|---|---|---|---|---|
| 2013/0122969 A1* | 5/2013 | Saitoh | ............ | H04M 1/274516 455/569.2 |
| 2014/0380505 A1* | 12/2014 | Camacho | ................ | G06F 21/31 726/28 |
| 2016/0366711 A1* | 12/2016 | Shanbhag | ............ | H04L 69/165 |
| 2017/0118598 A1* | 4/2017 | Hawkins | ................ | H04W 4/02 |

FOREIGN PATENT DOCUMENTS

| KR | 10-2009-0019167 A | 2/2009 |
|---|---|---|
| KR | 10-0970000 B1 | 7/2010 |
| KR | 2013-0123732 A | 11/2013 |
| KR | 2014-0055820 A | 5/2014 |
| KR | 10-1438835 B1 | 9/2014 |
| KR | 2015-0095013 A | 8/2015 |

\* cited by examiner

PHONE BOOK SYNCHRONIZATION CONTROL METHOD AND APPARATUS

CROSS-REFERENCE TO RELATED APPLICATION

This application claims the benefit of and priority to Korean Patent Application No. 10-2016-0050705, filed on Apr. 26, 2016, which is hereby incorporated by reference as if fully set forth herein.

BACKGROUND OF THE DISCLOSURE

Technical Field

The present disclosure relates generally to vehicular communication systems and, more particularly, to a phone book synchronization control method and apparatus of an audio-video-navigation (AVN) system mounted in a vehicle.

Discussion of the Related Art

An AVN system mounted in a vehicle may provide a driver with a variety of music, video, map guiding service (e.g., AM/FM radio, CD player, MP3 player, navigation, DMB, satellite TV services). For the sake of safety, however, a driver should avoid looking at the AVN system while driving and instead keep his or her eyes on the road and maintain control of the steering wheel while driving. Accordingly, many vehicles are equipped with AVN systems with a hands-free function to achieve driving safety and convenience, while observing traffic rules.

AVN systems with a hands-free function may provide not only a music/video service or a route guiding service, but also a phone calling service capable of entering phone numbers and searching for phone numbers using the hands-free function. In relation to the phone calling service, the AVN system may transmit and receive information using the hands-free function. More specifically, upon providing the phone calling service, the AVN system may enable wireless communication with a terminal, download phone number information, and store the phone number information therein.

Generally, since phone numbers stored in the terminal are frequently changed, the AVN system downloads the phone numbers stored in the terminal and stores the downloaded phone numbers therein whenever the terminal is connected to the AVN system through wireless communication. In other words, the AVN system may provide a function for synchronizing phone numbers of the terminal with phone numbers thereof.

However, some terminals may not transmit phone number information to the AVN system in order to avoid transmitting abnormal phone number information to the AVN system. In this case, phone numbers stored in the AVN system may be deleted contrary to user intention, and later the AVN system may be unable to use the previously stored phone numbers. Accordingly, a method for avoiding the unintended deletion of user phone numbers due to abnormal operation of a terminal is needed.

SUMMARY OF THE DISCLOSURE

Accordingly, the present disclosure is directed to a phone book synchronization control method and apparatus that substantially obviate one or more problems due to limitations and disadvantages of the related art.

An object of the present disclosure is to provide a phone book synchronization control method and apparatus that are capable of performing an operation according to user intention even when a terminal transmits an abnormal phone book in a process of phone number (or phone book) synchronization with the terminal to use a phone in a vehicle.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method of controlling an audio-video-navigation (AVN) system having at least one processor configured to control operation of the AVN system includes: establishing a phone book access profile (PBAP) with a terminal using a communication unit of the AVN system; requesting, using the PBAP, that the terminal transmit a phone book size indicating an amount of phone book information included in a first partial list among a plurality of phone book lists stored in the terminal; selecting an action to perform based on the phone book size, the action selected from a group consisting of: requesting that the terminal transmit all of the plurality of phone book lists, displaying a previously stored phone book list, and deleting the previously stored phone book list; and performing the selected action.

The method may further comprise: determining whether the terminal is in a normal state, according to the phone book size; requesting that the terminal transmit all of the plurality of phone book lists or deleting the previously stored phone book list, when the terminal is in the normal state; and displaying the previously stored phone book list when the terminal is not in the normal state.

The determining of whether the terminal is in a normal state may include determining that the terminal is in the normal state when the phone book size is greater than or equal to a preset first threshold.

The requesting that the terminal transmit all of the plurality of phone book lists or deleting the previously stored phone book list, when the terminal is in the normal state may include: requesting that the terminal transmit all of the plurality of phone book lists when the phone book size is greater than the preset first threshold and deleting the previously stored phone book list when the phone book size is equal to the preset first threshold.

The requesting that the terminal transmit the phone book size may include transmitting a start position (ListStartOffset) and an end position (MaxListCount) of the phone book information included in the first partial list to the terminal.

The requesting that the terminal transmit all of the plurality of phone book lists may include downloading and storing all of the plurality of phone book lists.

The method may further include establishing the PBAP with the terminal.

The establishing may include connecting to the terminal through wireless communication.

The connecting to the terminal may include connecting to the terminal once a head unit of a vehicle is activated after the vehicle is started (e.g., accessory-on or ignition state).

The wireless communication may be Bluetooth communication.

Furthermore, according to embodiments of the present disclosure, a non-transitory computer readable medium contains program instructions for controlling an audio-videonavigation (AVN) system having at least one processor configured to control operation of the AVN system, the program instructions when executed by the at least one processor causing the at least one processor to: establish a phone book access profile (PBAP) with a terminal using a communication unit of the AVN system; request, using the PBAP, that the terminal transmit a phone book size indicating an amount of phone book information included in a first partial list among a plurality of phone book lists stored in the terminal; select an action to perform based on the phone book size, the action selected from a group consisting of: requesting that the terminal transmit all of the plurality of phone book lists, displaying a previously stored phone book list, and deleting the previously stored phone book list; and perform the selected action.

Furthermore, in accordance with embodiments of the present disclosure, an audio-video-navigation (AVN) system having at least one processor configured to control operation of the AVN system includes: a communication unit establishing a phone book access profile (PBAP) with a terminal and requesting, using the PBAP, that the terminal transmit a phone book size indicating an amount of phone book information included in a partial phone book list among a plurality of phone book lists stored in the terminal; an output unit displaying one or more stored phone book lists; and a controller, which includes the at least one processor, selecting an action to perform based on the phone book size and performing the selected action. The action is selected from a group consisting of: requesting that the terminal transmit all of the plurality of phone book lists, displaying a previously stored phone book list via the output unit, and deleting the previously stored phone book list.

The controller determines whether the terminal is in a normal state, according to the phone book size.

The controller determines that the terminal is in the normal state when the phone book size is greater than or equal to a preset first threshold.

The controller may request that the terminal transmit all of the plurality of phone book lists when the phone book size is greater than the preset first threshold and delete the previously stored phone book list when the phone book size is equal to the preset first threshold.

The communication unit may request that the terminal transmit all of the plurality of phone book lists when the terminal is in the normal state The communication unit may request that the terminal transmit all of the phone book lists when the terminal is in the normal state.

The output unit may display the previously stored phone book list when the terminal is not in the normal state.

The communication unit may transmit a start position (ListStartOffset) and an end position (MaxListCount) of the phone book information included in the partial phone book list to the terminal.

The controller may further include a memory configured to download and store all of the plurality of phone book lists The communication unit may connect to the terminal through wireless communication once a head unit of a vehicle is activated after the vehicle is started (e.g., accessory-on or ignition state).

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION OF THE DISCLOSURE

Reference will now be made in detail to the embodiments of the present disclosure, examples of which are illustrated in the accompanying drawings. In addition, in the following description of the embodiments disclosed herein, a detailed description of related known technologies will be omitted when it may make the subject matter of the embodiments disclosed herein rather unclear.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The suffixes "module" and "unit" used in the description below are given or used together only in consideration of ease in preparation of the specification and do not have distinctive meanings or functions.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one controller. The term "controller" may refer to a hardware device that includes a memory and at least one processor. The memory is configured to store program instructions, and the at least one processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art.

Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Referring now to the presently disclosed embodiments, an AVN system according to embodiments of the present disclosure may use a phone book access profile (PBAP) as procedures and protocols to exchange phone book objects with a terminal. In the PBAP, phone book server equipment (PSE) is a device that contains source phone book objects and phone book client equipment (PCE) is a device that searches for and downloads phone book objects from the PSE.

The PCE may access the list of telephone book entries stored in the PSE and download one or several telephone book entries stored in the PSE from the PSE. The PCE may also access call histories stored in the PSE. The PCE and the PSE may be used in a vehicle, a mobile phone, a smartphone, a personal digital assistance (PDA), a portable multimedia player (PMP), a navigation device, and the like. However, the present disclosure is not limited thereto and any device in which a wireless communication means using the PBAP is installed may be used as the PCE and the PSE. The terms terminal and device are used interchangeably.

The PBAP may use Bluetooth communication as a wireless communication means between the PCE and the PSE. More specifically, the PBAP may use physical and data link layers of a Bluetooth protocol, a Bluetooth serial port emulation entity, or a Bluetooth service discovery protocol. As embodiments of the present disclosure, the PSE may be a terminal carried by a driver and the PCE may be an AVN system of a vehicle, wherein the AVN system may request that the terminal transmit phone book objects stored in the terminal and download and store the phone book objects.

Prior to a detailed description of the present disclosure, phone book objects stored in the PSE, i.e., a list of phone books is defined as a "phone book list" and each item stored in the phone book list is defined as "phone book information".

Hereinafter, a general procedure of the PBAP will be described with reference to FIG. 1 and problems generated in the general PBAP procedure will be described with reference to FIGS. 2 and 3. Next, a phone book synchronization control method and apparatus to solve the problems generated in FIGS. 2 and 3 will be described with reference to FIGS. 4 and 5 as embodiments of the present disclosure.

Figure 1:
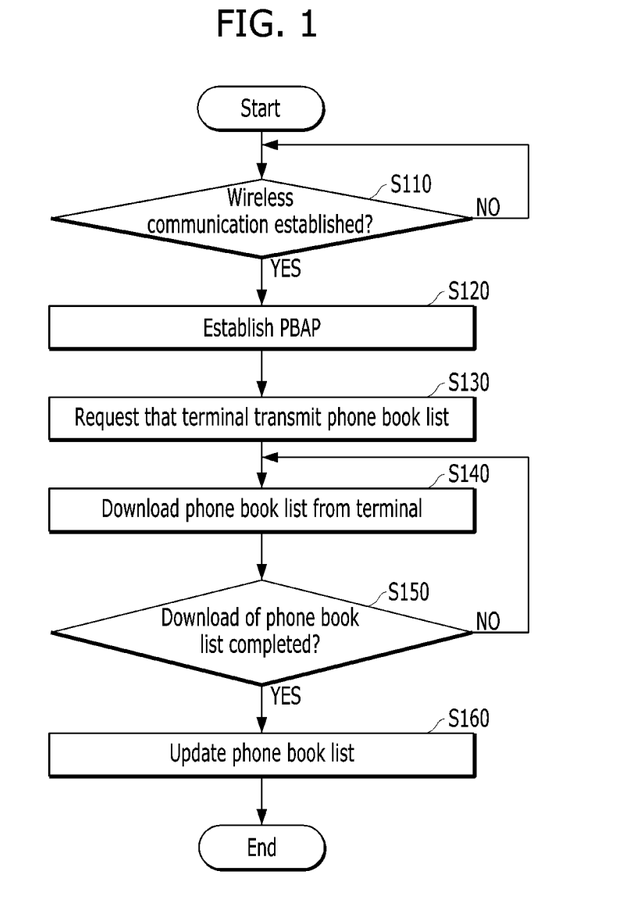
FIG. 1 is a flowchart illustrating a general phone book synchronization method with a terminal.

FIG. 1 is a flowchart illustrating a general phone book synchronization method with a terminal.

As shown in FIG. 1, an AVN system of a vehicle establishes wireless communication with a terminal carried by a driver or a passenger riding in the vehicle (S110).

In embodiments of the present disclosure, the AVN system may use a PBAP, which is a Bluetooth protocol supporting Bluetooth communication. Therefore, wireless communication in the present disclosure may be Bluetooth communication. If wireless communication is established between the AVN system and the terminal, the AVN system establishes the PBAP with the terminal, using wireless communication (S120).

As described above, the AVN system may establish the PBAP with the terminal, using physical and data link layers of the Bluetooth protocol, a Bluetooth serial port emulation entity, or a Bluetooth service discovery protocol. If PBAP establishment with the terminal is completed, the AVN system transmits, to the terminal, a signal requesting that the terminal transmit a phone book list (S130), downloads the phone book list from the terminal (S140 and S150), stores the phone book list in a memory in the AVN system, and updates the phone book list (S160).

In embodiments of the present disclosure, the AVN system may include a head unit of the vehicle and store the phone book list downloaded from the terminal in the head unit.

Figure 2:
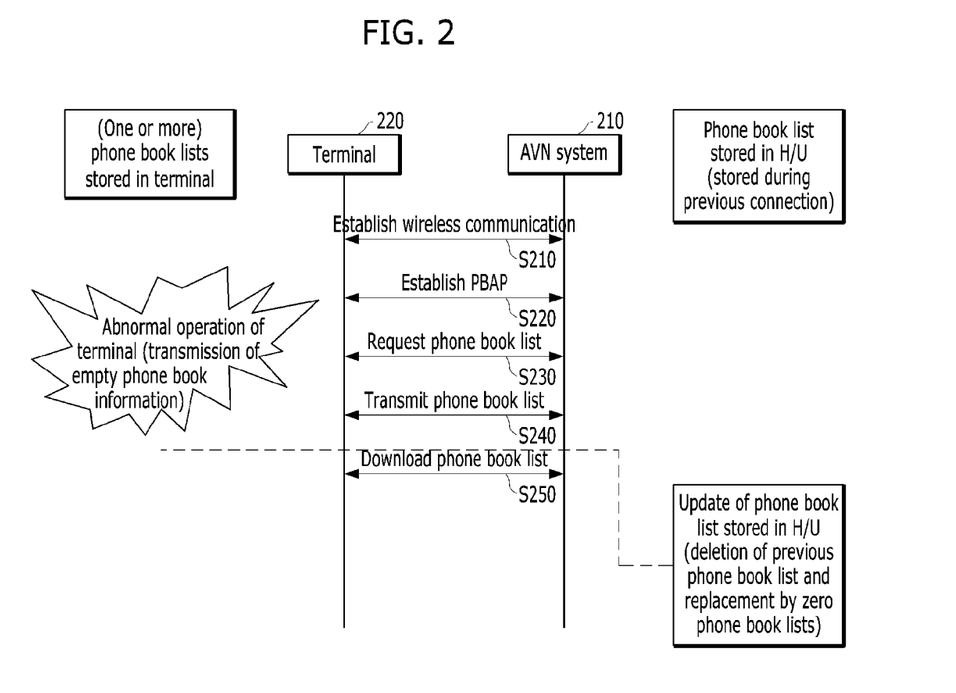
FIG. 2 is a flowchart illustrating problems that may be generated by abnormal operation of a terminal in the general phone book synchronization method.

FIG. 2 is a flowchart illustrating problems that may be generated by abnormal operation of a terminal in the general phone book synchronization method.

As shown in FIG. 2, an AVN system 210 stores a previous phone book list in a head unit (H/U), and a terminal 220 stores a phone book list (e.g., source phone book objects) that may be changed later.

A procedure in which wireless communication is established between the AVN system 210 and the terminal 220 (S210), a PBAP is established using wireless communication (S220), and the AVN system 210 requests that the terminal 220 transmit a phone book list (S230) is the same as in FIG. 1.

Upon transmitting the phone book list according to the request by the AVN system 210 (S240), the terminal 220 may transmit empty phone book information due to abnormal operation thereof. Upon receiving empty phone book information, the AVN system 210 deletes the previously stored phone book list and stores an empty phone book list. In other words, the previously stored phone book list is deleted contrary to user intention.

Abnormal operation of the terminal will now be described with reference to FIG. 3.

Figure 3:
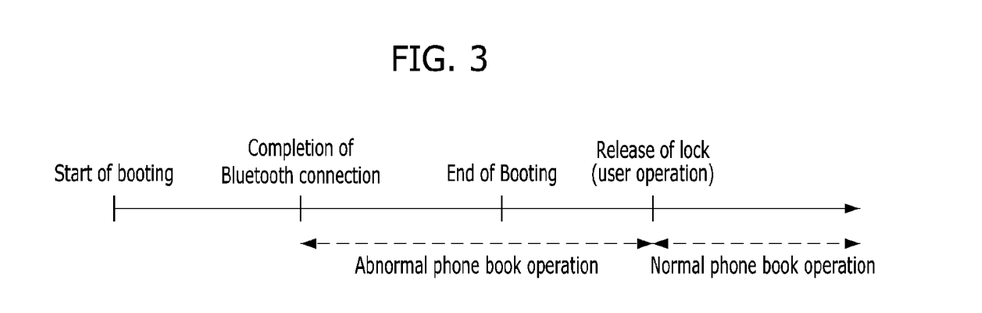
FIG. 3 is a diagram illustrating the case in which abnormal operation of the terminal may occur according to embodiments of the present disclosure.

FIG. 3 is a diagram illustrating the case in which abnormal operation of the terminal may occur according to embodiments of the present disclosure.

As shown in FIG. 3, abnormal operation of a terminal may occur until lock of the terminal is released by an operation of a terminal user after an AVN system of a vehicle starts to be booted and Bluetooth connection between the AVN system and the terminal is completed.

Although PBAP connection through Bluetooth has been completed before the user releases lock of the terminal, the terminal may transmit an empty phone book list as a response to a request for a phone book list. Such a problem may not always be generated in terminals, and some terminals suffer from the problem as in FIG. 3.

To solve the above problem, a phone book synchronization control method and apparatus according to an embodiment of the present disclosure will now be described with reference to FIGS. 4 and 5.

Figure 4:
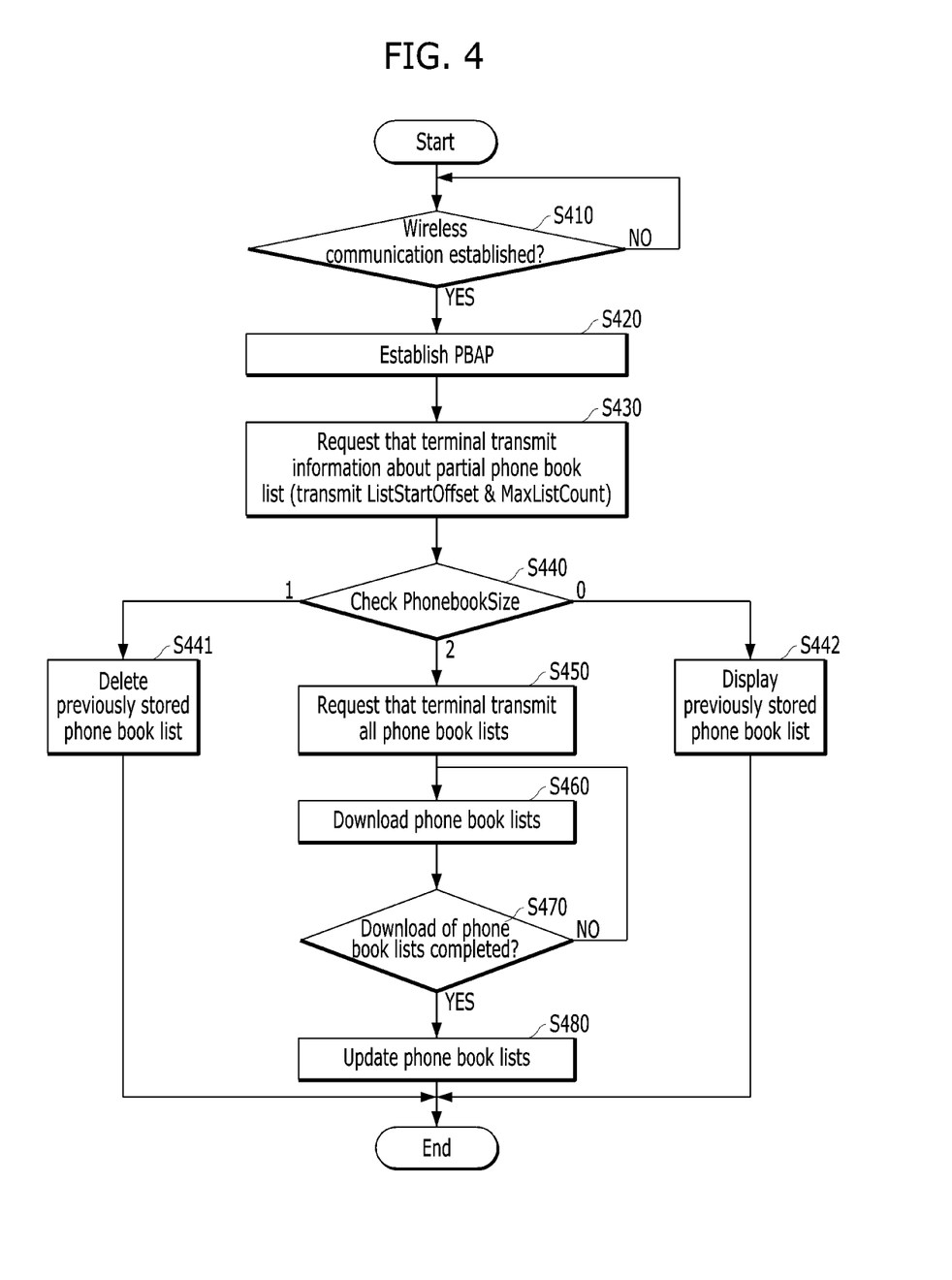
FIG. 4 is a flowchart illustrating a phone book synchronization method according to embodiments of the present disclosure.

FIG. 4 is a flowchart illustrating a phone book synchronization method according to embodiments of the present disclosure.

As shown in FIG. 4, a procedure for establishing wireless communication between an AVN system and a terminal (S410) and establishing a PBAP using wireless communication is identical to that in FIG. 1.

The AVN system requests that the terminal requests that the terminal transmit the amount of phone book information of a partial phone book list (i.e., "a first partial list") among phone book lists stored in the terminal (S430).

In this case, the AVN system transmits a starting position (ListStartOffset) and an end position (MaxListCount) of the phone book information included in the first partial list which is to be transmitted by the terminal to the terminal. ListStartOffset and MaxListCount are relative values indicating the start and end positions of the phone book information which is to be transmitted by the terminal. For example, if the AVN system requests that the terminal transmit the amount of phone book information of the partial phone book list (i.e., "first partial list") by setting ListStartOffset=0 and MaxListCount=5, the AVN system may receive information indicating the amount (e.g., number) of phone book information (i.e., 6) starting from number 0 to number 5 from the terminal. However, if the number of phone book information stored in the terminal is 3, the AVN system may receive information indicating that the number of phone book information (PhonebookSize) is 3 from the terminal.

The AVN system checks the amount (or number) of phone book entries (PhonebookSize) received from the terminal (S440). If PhonebookSize is 0 (path "0" of S440), the AVN system displays a previously stored phone book list (S442). That is, if PhonebookSize is 0, the AVN system determines that the state of the terminal is an abnormal state and displays the previously stored phone book list without deleting the list.

PhonebookSize indicates the amount of phone book information that is actually stored in the terminal. The AVN system may request a phone book list using three values ListStartOffset, MaxListCount, and PhonebookSize and determine the amount of phone book information.

If the terminal performs a normal operation according to PBAP establishment, the terminal transmits one or more phone book information including a phone number of the terminal to the AVN system. Accordingly, when PhonebookSize received by the AVN system is 0, the AVN system may determine that the terminal performs abnormal operation and displays the previously stored phone book list.

If PhonebookSize is 1 (path "1" of S440), the AVN system may determine that the terminal performs a normal operation. That is, if the terminal performs a normal operation, the terminal stores one or more phone book information including a phone number thereof However, if PhonebookSize is 1, since it is determined that a user intends to delete a previous phone book list, the AVN system deletes the previously stored phone book list (S441).

If PhonebookSize is 2 or more (path "2 or more" of S440), the AVN system requests that the terminal transmit all of the phone book lists (S450). That is, when PhonebookSize is 2 or more, the AVN system determines that the terminal performs a normal operation and requests that the terminal transmit all of the phone book lists.

The terminal transmits phone book information for all of the phone book lists to the AVN system. The next procedure in which the AVN system downloads the phone book lists (S460) and updates the phone book lists (S480) is identical to that in FIG. 1.

Figure 5:
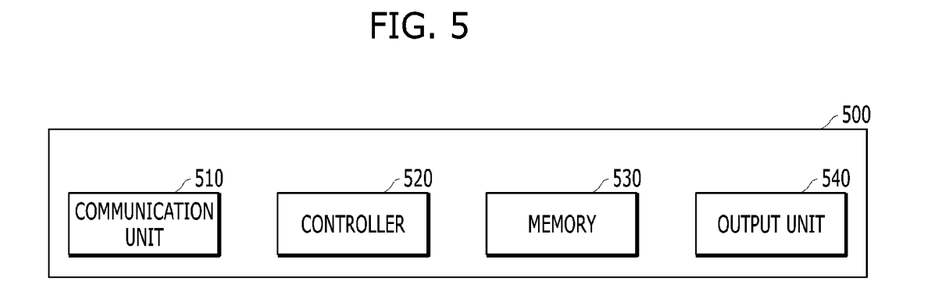
FIG. 5 is a diagram illustrating the structure of a phone book synchronization control apparatus according to embodiments of the present disclosure.

FIG. 5 is a diagram illustrating the structure of a phone book synchronization control apparatus according to embodiments of the present disclosure.

As shown in FIG. 5, a phone book synchronization control apparatus 500 may include a communication unit 510, a controller 520, a memory 530, and an output unit 540.

Constituent elements illustrated in FIG. 5 are not always necessary and the phone book synchronization control apparatus may be implemented with more elements or fewer elements.

The communication unit 510 connects a PBAP to a terminal, requests that the terminal transmit a partial phone book list using the PBAP, and transmits and receives signals and data to control the memory 530 and the output unit 5450.

The controller 520 may perform data processing and operation to control the phone book synchronization control apparatus 500. In embodiments of the present disclosure, the controller 520 requests that the terminal transmit all phone book lists or delete a previously stored phone book list according to a phone book size received from the terminal. In addition, the controller 520 causes the output unit 540 to display the previously stored phone book list or causes the communication unit 510 to request that the terminal transmit all of the phone book lists.

The memory 530 indicates a space and/or a storage region in which predetermined program code for controlling overall operation of the phone book synchronization control apparatus 500 is stored and data which is input/output when an operation according to the program code is stored. The memory 530 is provided as an electrically erasable programmable read only memory (EEPROM), a flash memory (FM), or a hard disk drive.

The output unit 540 may include a display capable of visually displaying previous phone book information so that the user can see the information.

According to the present disclosure, the phone book synchronization control method and apparatus have the following effects.

Firstly, a problem in which existing phone book information stored in an AVN system is deleted can be prevented through particular processing for abnormal operation of a terminal that transmits a phone book.

Secondly, a response delay can be minimized by requesting partial phone book information in performing particular processing for abnormal operation of the terminal.

Thirdly, even though phone book information is not received due to abnormal operation of the terminal, an already stored phone book can be displayed without performing additional synchronization.

Fourthly, if a user desires to delete a phone book, the phone book can be deleted through synchronization as the user has intended.

It will be apparent to those skilled in the art that various modifications and variations can be made in the present disclosure without departing from the spirit or scope of the disclosure.

The above description is therefore to be construed in all aspects as illustrative and not restrictive. The scope of the disclosure should be determined by reasonable interpretation of the appended claims and all changes coming within the equivalency range of the disclosure are within the scope of the disclosure.

What is claimed is:

1. A method of controlling an audio-video-navigation (AVN) system having at least one processor configured to control operation of the AVN system, the method comprising:
   establishing a phone book access profile (PBAP) with a terminal using a communication unit of the AVN system;
   requesting, using the PBAP, that the terminal transmit a phone book size indicating an amount of phone book information included in a first partial list among a plurality of phone book lists stored in the terminal;

selecting an action to perform based on the phone book size, the action selected from a group consisting of: requesting that the terminal transmit all of the plurality of phone book lists, displaying a previously stored phone book list, and deleting the previously stored phone book list; and performing the selected action, wherein the requesting that the terminal transmit the phone book size comprises:

transmitting a start position (ListStartOffset)and an end position (MaxListCount) of the phone book information included in the first partial list to the terminal.

2. The method according to claim 1, further comprising:

determining whether the terminal is in a normal state, according to the phone book size;

requesting that the terminal transmit all of the plurality of phone book lists or deleting the previously stored phone book list, when the terminal is in the normal state; and displaying the previously stored phone book list when the terminal is not in the normal state.

3. The method according to claim 2, wherein the determining of whether the terminal is in a normal state comprises:

determining that the terminal is in the normal state when the phone book size is greater than or equal to a preset first threshold.

4. The method according to claim 3, wherein the requesting that the terminal transmit all of the plurality of phone book lists or deleting the previously stored phone book list, when the terminal is in the normal state comprises:

requesting that the terminal transmit all of the plurality of phone book lists when the phone book size is greater than the preset first threshold; and deleting the previously stored phone book list when the phone book size is equal to the preset first threshold.

5. The method according to claim 4, wherein the requesting that the terminal transmit all of the plurality of phone book lists comprises:

downloading and storing all of the plurality of phone book lists.

6. The method according to claim 1, further comprising: establishing the PBAP with the terminal.

7. The method according to claim 6, wherein the establishing comprises:

connecting to the terminal through wireless communication.

8. The method according to claim 7, wherein the connecting to the terminal comprises:

connecting to the terminal once a head unit of a vehicle is activated after the vehicle is started.

9. The method according to claim 7, wherein the wireless communication is Bluetooth communication.

10. A non-transitory computer readable medium containing program instructions for controlling an audio-video-navigation (AVN) system having at least one processor configured to control operation of the AVN system, the program instructions when executed by the at least one processor causing the at least one processor to:

establish a phone book access profile (PBAP) with a terminal using a communication unit of the AVN system;

request, using the PBAP, that the terminal transmit a phone book size indicating an amount of phone book information included in a first partial list among a plurality of phone book lists stored in the terminal;

select an action to perform based on the phone book size, the action selected from a group consisting of: requesting that the terminal transmit all of the plurality of phone book lists, displaying a previously stored phone book list, and deleting the previously stored phone book list; and perform the selected action, wherein the communication unit transmits a position (ListStartOffset) and an end position (MaxListCount) of the phone book information included in the partial phone book list to the terminal.

11. An audio-video-navigation (AVN) system having at least one processor configured to control operation of the AVN system, the AVN system comprising:

a communication unit establishing a phone book access profile (PBAP) with a terminal and requesting, using the PBAP, that the terminal transmit a phone book size indicating an amount of phone book information included in a partial phone book list among a plurality of phone book lists stored in the terminal;

an output unit displaying one or more stored phone book lists; and a controller, which includes the at least one processor, selecting an action to perform based on the phone book size and performing the selected action, wherein the action is selected from a group consisting of: requesting that the terminal transmit all of the plurality of phone book lists, displaying a previously stored phone book list via the output unit, and deleting the previously stored phone book list, and the communication unit transmits a start position (ListStartOffset) and an end position (MaxListCount) of the phone book information included in the partial phone book list to the terminal.

12. The AVN system according to claim 11, wherein the controller determines whether the terminal is in a normal state, according to the phone book size.

13. The AVN system according to claim 12, wherein the controller determines that the terminal is in the normal state when the phone book size is greater than or equal to a preset first threshold.

14. The AVN system according to claim 13, wherein the controller:

requests that the terminal transmit all of the plurality of phone book lists when the phone book size is greater than the preset first threshold; and deletes the previously stored phone book list when the phone book size is equal to the preset first threshold.

15. The AVN system according to claim 11, wherein the communication unit requests that the terminal transmit all of the plurality of phone book lists when the terminal is in the normal state.

16. The AVN system according to claim 12, wherein the output unit displays the previously stored phone book list when the terminal is not in the normal state.

17. The AVN system according to claim 11, wherein the controller further comprises a memory configured to download and store all of the plurality of phone book lists.

18. The AVN system according to claim 11, wherein the communication unit connects to the terminal through wireless communication once a head unit of a vehicle is activated after the vehicle is started.

* * * * *